(12) United States Patent
Kuksenkov et al.

(10) Patent No.: US 7,486,436 B1
(45) Date of Patent: Feb. 3, 2009

(54) ALL FIBER CHIRPED PULSE AMPLIFICATION SYSTEM AND METHOD

(75) Inventors: Dmitri Vladislavovich Kuksenkov, Painted Post, NY (US); Shenping Li, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/729,896

(22) Filed: Mar. 29, 2007

(51) Int. Cl.
*H01S 4/00* (2006.01)

(52) U.S. Cl. ............... 359/333; 359/337.5; 359/341.5; 398/199

(58) Field of Classification Search ............... 359/333, 359/341.1, 337.5; 398/199
See application file for complete search history.

(56) References Cited

U.S. PATENT DOCUMENTS

| | | | | |
|---|---|---|---|---|
| 5,838,867 | A * | 11/1998 | Onishi et al. ............... | 385/123 |
| 7,209,619 | B2 * | 4/2007 | Dong et al. ............... | 385/127 |
| 2004/0263950 | A1 * | 12/2004 | Fermann et al. ............ | 359/333 |
| 2005/0018714 | A1 | 1/2005 | Fermann et al. ............... | 372/6 |
| 2005/0105865 | A1 | 5/2005 | Fermann et al. ............ | 385/122 |
| 2005/0169324 | A1 | 8/2005 | Ilday et al. ............... | 372/18 |
| 2006/0209908 | A1 * | 9/2006 | Pedersen et al. ............... | 372/6 |

FOREIGN PATENT DOCUMENTS

WO     WO2004/109869     5/2004

OTHER PUBLICATIONS

Website http://web.archive.org/web/20050412222102/www.crystal-fibre.com/datasheets/HC-1550-02.pdf (dated Apr. 12, 2005).*

"Multi-kilowatt, picosecond pulses from an all-fiber chirped pulse amplification system using air-core photonic bandgap fiber", C.J.S. de Matos and J.R. Taylor; CLEO'04 proceedings, paper CTuBB7, San Francisco, May 16-21, 2004.

"Femtosecond pulse compression around 1 um wavelength in air-guiding PBGF"; A.B. Rulkov, S.V. Popov. J.R. Taylor, T. Hansen and J. Broeng; CLEO'04 proceedings, paper CWK1, San Francisco, May 16-21, 2004.

(Continued)

*Primary Examiner*—Eric Bolda
(74) *Attorney, Agent, or Firm*—Svetlana Z. Short

(57) ABSTRACT

An all-fiber chirped pulse amplification (CPA) system and method is provided that utilizes a hollow core photonic bandgap fiber as a pulse compressor and a dispersion compensating optical fiber as a pulse stretcher that are matched with respect to both the amount and slope of dispersion to avoid peak power-limiting pulse distortion. The CPA system includes a rare earth ion-doped optical fiber amplifier having an input and an output that amplifies optical pulses having a center wavelength of $\lambda c$, a pulse compressing length L1 of hollow core photonic bandgap fiber having a dispersion value D1 and a dispersion slope S1 that varies over a wavelength $\lambda$ of the pulses that is optically connected to the output of the fiber amplifier and having a k-parameter defined by a ratio of D1 over the slope of the function $D1(\lambda)$ that is larger than about 50, and a pulse stretching length L2 of dispersion compensating optical fiber connected to the input of the fiber amplifier having a dispersion value D2 and dispersion slope S2. The lengths are selected such that $L1D1 = -L2D2$, and the center wavelength $\lambda c$ of the inputted optical pulses is preferably close to the center wavelength of the bandgap of the photonic bandgap fiber.

20 Claims, 5 Drawing Sheets

OTHER PUBLICATIONS

"Study of the dispersion of an air-core photonic bandgap fiber and its application as a linear chirped pulse compressor"; C.J.S. de Matos, J.R. Taylor, T. Hansen, K. Hansen and J. Broeng; CLEO'04 proceedings, paper CWK2, San Francisco, May 16-21, 2004.

"All fiber CPA system based on air-guiding photonic bandgap fiber compressor"; J. Limpert, T. Schreiber, S. Nolte, H. Zellmer and A. Tunnermann; CLEO'04 proceedings, paper CThK4, San Francisco, May 16-21, 2004.

"Generation of Megawatt Optical Solitons in Hollow-Core Photonic Band-Gap Fibers"; D.G. Ouzounov, F.R. Ahmad, D. Muller, N. Venkataraman, M.T. Gallagher, M.G. Thomas, J. Silcox, K.W. Koch and A.L. Gaeta; Science, 301, 1702-1704, Sep. 2003.

* cited by examiner

ALL FIBER CHIRPED PULSE AMPLIFICATION SYSTEM AND METHOD

FIELD OF THE INVENTION

This invention generally relates to optical pulse amplification systems, and is specifically concerned with an all fiber chirped pulse amplification system and method that uses photonic bandgap fiber as a pulse compressor.

BACKGROUND OF THE INVENTION

Chirped pulse amplification (CPA) is a technique allowing amplification of ultra-short light pulses to a very high energy/power level in a solid state amplifier. To avoid pulse distortion or break up due to the optical nonlinearity of the amplification medium, the pulse is stretched (typically by at least several hundred times) by passing it through a strongly dispersive element and thereby "chirping" it, or delaying its spectral components in respect to each other. Stretching greatly reduces peak optical power for the same pulse energy. After amplification, the pulse is compressed back to its original duration. Such pulse compression is typically accomplished using bulk optics (prisms and/or gratings) for the same reason of avoiding nonlinear distortion. Unfortunately, existing bulk optics compressors are typically very bulky, with a physical length of 1 meter or more.

Recent development of a new type of optical fiber, called photonic bandgap fiber (PBGF) opened up the possibility of an entirely new type of pulse compressor. Unlike conventional optical fiber having a glass core, PBGF has a hollow core for guiding light (which may contain air or a vacuum if the fiber core is evacuated) and consequently has an optical nonlinearity roughly 1000 times less than conventional fiber. At the same time, PBGF can have a very large chromatic dispersion per length. These optical characteristics permit a segment of PBGF to be substituted for the bulk optics pulse compressor used in conventional CPA systems, keeping the advantage of low pulse distortion while allowing a much more compact and potentially all-fiber design where all parts of the CPA system (stretcher, amplifier and compressor) are segments of different types of fiber spliced together.

The substitution of PBGF fiber for the bulk optics compressors used in conventional CPA systems has been accomplished experimentally. However, the potential advantages have been only partially recognized by such prior art designs as either the compressed pulse width could not be reduced below 1 picosecond, or the stretching ratio of the pulses entering the amplifier did not exceed 40 times (which would limit ultimately achievable amplified power/energy for the same amplifier design). Further compression of the pulse width by the PBGF or stretching by the dispersion compensating fiber used in this device results in unacceptably high degrees of pulse distortion due to the difficulty of matching the relatively high dispersion slope of the PBGF with the opposite dispersion slope of the dispersion compensating fiber. A CPA system design using a PBGF fiber compressor is also known that uses a stretcher consisting of one or multiple nonlinearly chirped fiber Bragg gratings (CFBG). This system design has the advantage of being able to match the dispersion slope of the stretcher with the dispersion slope of the PBGF. However, this system is not free of disadvantages. First, group delay ripple of the CFBGs can easily exceed several picoseconds, introducing distortion that can not be compensated. Second, exact compensation might require multiple CFBGs with multiple independently tunable segments each, greatly increasing complexity and cost of the overall system.

Clearly, there is a need for an all-fiber CPA system capable of amplifying high energy pulses to the same amplitude as conventional CPA systems using bulk optic compressors without excessive distortion. Ideally, such a CPA system would use only dispersion compensating fiber to stretch the pulses prior to amplification, and not rely upon nonlinearly chirped fiber Bragg gratings in the pulse stretcher which require multiple tuning steps and can introduce unwanted distortions in the amplified pulses. Finally, such a CPA system should be simple and compact in structure, robust, and easy to install and use.

SUMMARY OF THE INVENTION

This invention stems from the applicants' observation that (1) the $D1(\lambda)$ function for a photonic bandgap fiber has a variable slope $S1=d(D1)/d1$ within a wavelength 1 range corresponding to the photonic bandgap, and that (2) the slope $S1$ is minimal (the $D1(\lambda)$ curve is the flattest and most linear) in the middle of the bandgap, which in turn allows designing a dispersion compensating optical fiber having an equal and opposite dispersion value $D2(1)$ across the wavelength range $\lambda$ of the optical pulses. This relatively flat and linear segment of the function $D1(\lambda)$ is defined by a k-parameter (corresponding to a ratio of D1 and S1) that is larger than about 50.

Accordingly, the CPA system of the invention comprises an optical fiber amplifier having an input and an output that amplifies optical pulses having a center wavelength of $\lambda c$, a pulse compressing length L1 of hollow core photonic bandgap fiber having a dispersion value D1 and a dispersion slope S1 at $\lambda c$ that is optically connected to the output of the fiber amplifier and having a k-parameter defined by a ratio of D1 and S1 that is larger than about 50, and a pulse stretching length L2 of dispersion compensating optical fiber connected to the input of the fiber amplifier having a dispersion value D2 and dispersion slope S2 at $\lambda c$ such that $L1D1=-L2D2$ and $L1S1=-L2S2$.

The photonic bandgap fiber may be gas filled, or evacuated in order to minimize nonlinear distortion. The photonic bandgap fiber and the dispersion compensating optical fiber are preferably fusion spliced to an output end and input end, respectively, of the optical fiber amplifier to reduce losses at said optical connections. The fiber amplifier preferably includes fiber doped with a rare earth element such as erbium or ytterbium and has normal dispersion to avoid a soliton effect in the amplifier.

The CPA system may further include a pulse generator that generates pulses having a center wavelength $\lambda c$ that is sufficiently close the center wavelength of the photonic bandgap to ensure that k-parameter of the bandgap fiber at $\lambda c$ is larger than 50, and a polarization controller optically connected to the input of the optical fiber amplifier that controls the polarization state of the optical pulses.

In operation, said photonic bandgap fiber may compress the optical pulse, having energy greater than 100 nanojoules, to a width of less than 100 femtoseconds, while the dispersion compensating fiber may stretch the length of the optical pulses by more than 400 times.

The invention further encompasses a chirped pulse amplification method that generally comprises the steps of generating optical pulses having a center wavelength $\lambda c$ and a pulse width of less than 200 femtoseconds; stretching the length of said optical pulses by a factor of more than 100; amplifying the stretched optical pulses, and compressing the amplified stretched pulses to a pulse width of less than 200 femtoseconds with a length of hollow core photonic bandgap fiber having a dispersion value D1 and a dispersion slope S1 at λc wherein λc is sufficiently close to the center wavelength of the bandgap so that a k-parameter defined by a ratio of D1 to S1 is larger than about 50.

DETAILED DESCRIPTION OF THE PREFERRED EMBODIMENT

Figure 1:
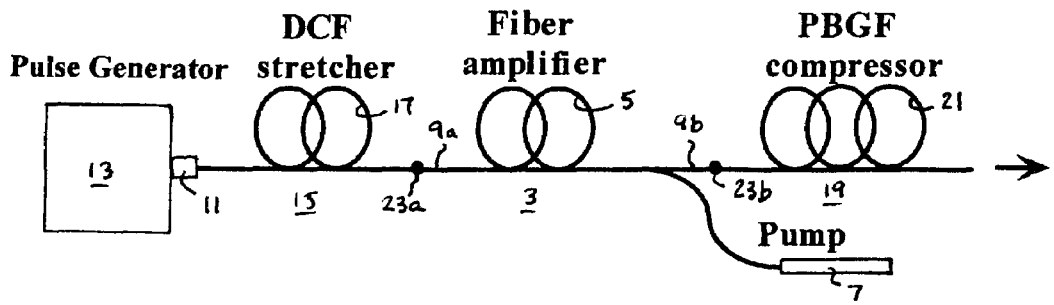
FIG. 1 is a schematic drawing of the all fiber CPA system of the invention.

With reference now to FIG. 1, the all-fiber chirped pulse amplification (CPA) system 1 of the invention comprises a fiber amplifier 3 including a segment 5 of fiber doped with a rare earth metal such as erbium or ytterbium coupled to a light pump 7 which is typically a laser that generates light at the excitation frequency of the dopant atoms in the segment 5. The fiber amplifier has an input 9a and an output 9b as shown. While not expressly shown in the diagram, the fiber amplifier 3 may include a pre-amplifier serially connected to a power amplifier, and is preferably of a double-clad design that allows for a high power output. The fiber amplifier 3, per se, does not constitute the invention and any number of prior art designs may be used to implement the system and method of the invention.

A pulse generator 13 is optically connected to a pulse stretcher 15. The pulse generator 13 may be a mode-locked fiber laser that generates pulses with energy on the order of 1 nanojoule, and includes a polarization controller 11 at its output end which (as is explained hereinafter) assists with pulse compression at high amplification levels. The pulse stretcher 15 is formed by a segment 17 of dispersion compensating optical fiber (DCF). The pulse stretcher 15 is connected to the input 9a of the fiber amplifier 3 as shown. A pulse compressor 19 formed from a segment of photonic bandgap fiber 21 is connected to the output end 9b of the fiber amplifier. The pulse stretcher 15 and pulse compressor 19 are preferably connected to the input and output ends 9a, 9b via fusion splices 23a, 23b, respectively, in order to minimize losses at these connection points, although mechanical splicing or a lens coupling arrangement is also possible and is within the scope of the invention. The photonic bandgap fiber 21 has a dispersion D1 and a length L1, while the segment 17 of DCF has a dispersion D2 and a length L2. The dispersion values D1, D2, and lengths L1, L2 are chosen such that L1D1=−L2D2.

Figure 2A:
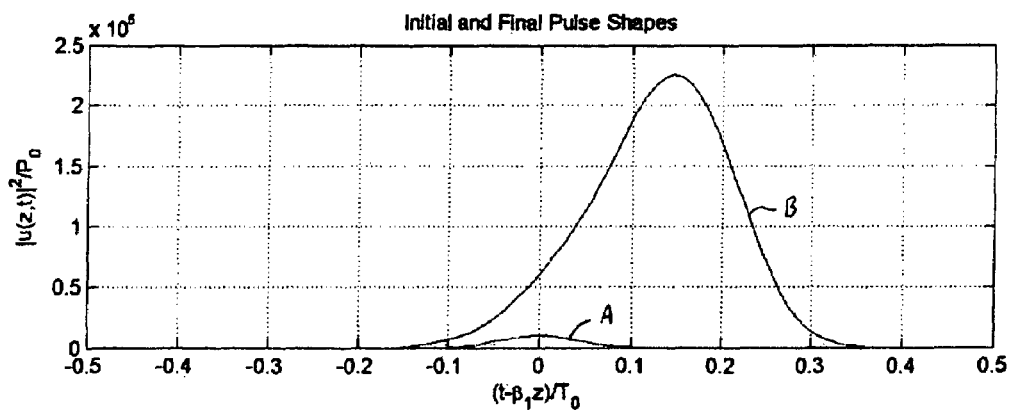
FIG. 2A illustrates the initial and final pulse shapes of prior art all-fiber CPA systems using a segment of hollow core photonic bandgap fiber as a pulse compressor which provides an equal and opposite amount of dispersion to a segment of dispersion compensating fiber used as a pulse stretcher, but wherein the slopes of the dispersion over wavelength functions D(k) are not symmetrically matched.

FIG. 2A illustrates the shape of the final amplified pulse B that would be obtained by the all-fiber CPA system 1 receiving a Gaussian-shaped input pulse A wherein the segment 21 of hollow core photonic bandgap fiber used as a pulse compressor 19 provides an equal and opposite amount of dispersion to the segment 17 of dispersion compensating fiber used as the pulse stretcher 15, but wherein the slopes of the dispersion over wavelength functions D(λ) for the two fiber segments 17, 21 are not symmetrically matched. The final pulse A was generated via a numerical nonlinear Shroedinger equation integrator model based on a split-step Fourier approach and including effects of arbitrary order dispersion, Raman self-frequency shift, self-steepening and gain dispersion effects. The Gaussian-shaped input pulses A have a 100 femtosecond width and a 1 nanoJoule energy (10 kW peak power), typical for a mode-locked fiber laser which may be used as the pulse generator 13. The photonic bandgap fiber 21 in this example has a dispersion D1 of 40 ps/nm/km and a slope of 0.4 ps/nm$^2$/km at the central wavelength λc of the pulse, a mode area of 70 mm$^2$ and a nonlinear refractive index of $3.02\times10^{-23}$ m$^2$/W. The DCF fiber segment 17 used in the pulse stretcher 15 has a dispersion D2 of −100 ps/nm/km at the central wavelength λc of the pulse, an effective area of 20 mm$^2$ and a nonlinear refractive index of $2.6\times10^{-20}$ m$^2$/W, all of which are typical for commercially available dispersion compensating fiber. FIG. 2A represents the simulation results for a case where the fiber amplifier 3 has a gain of 23 dB and no nonlinearity, the PBGF fiber has a length L1 of 50 meters and the DCF fiber has a length L2 of 20 meters and has zero dispersion slope. As can be easily seen, the total dispersion of stretcher 15 and compressor 19 is exactly equal for the central wavelength λc of the pulse (2000 ps/nm). Stretching by 500 times, a pulse width of 50 pico seconds (not shown) is achieved by the stretcher 15. However, due to the absence of slope compensation, the original pulse shape is not restored. Output pulses B have a width of about 200 femtoseconds, or about twice the width of the initial pulses A. The resulting peak power is only about 225 kW.

Figure 2B:
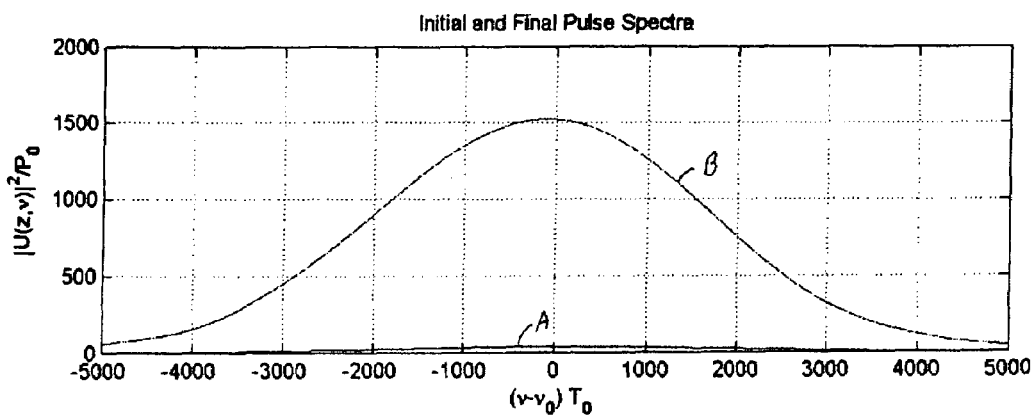
FIG. 2B illustrates that the spectrum of the initial and final pulses stay the same because there are no non-linear optical effects in the photonic bandgap fiber.

FIG. 2B illustrates that the spectrum of the initial and final pulses stay the same because there are no non-linear optical effects in the photonic bandgap fiber.

It is well known that optical nonlinearities are especially detrimental when combined with positive (anomalous) chromatic dispersion. For that reason, in all prior art designs the stretcher fiber has negative (normal) dispersion and, therefore, positive dispersion is required of the photonic bandgap fiber (PBGF) used as the compressor. Fortunately, this condition is easy to meet in the spectral range around 1500 nm, for which high quality and low loss PBGF fibers are now commercially available. Due to the specifics of PBGF waveguiding which will not be discussed here, silica glass PBGF designed to operate in the 1500 nm spectral range typically has a medium value positive (anomalous) dispersion in the middle wavelength of the bandgap of the fiber (which is the range of wavelengths confined within and guided by the hollow core of the fiber), and high value positive dispersion near the long-wavelength end of the bandgap. In prior art designs, the bandgap of the PBGF used as the compressor fiber was selected such that the center wavelength $\lambda c$ of the amplified pulses corresponded to the long-wavelength side $\lambda_L$ of the bandgap to provide a very large positive dispersion. This had the advantage of necessitating only a few meters length of PBGF in order to accomplish the compression, minimizing power loss due to fiber attenuation.

Figure 3A:
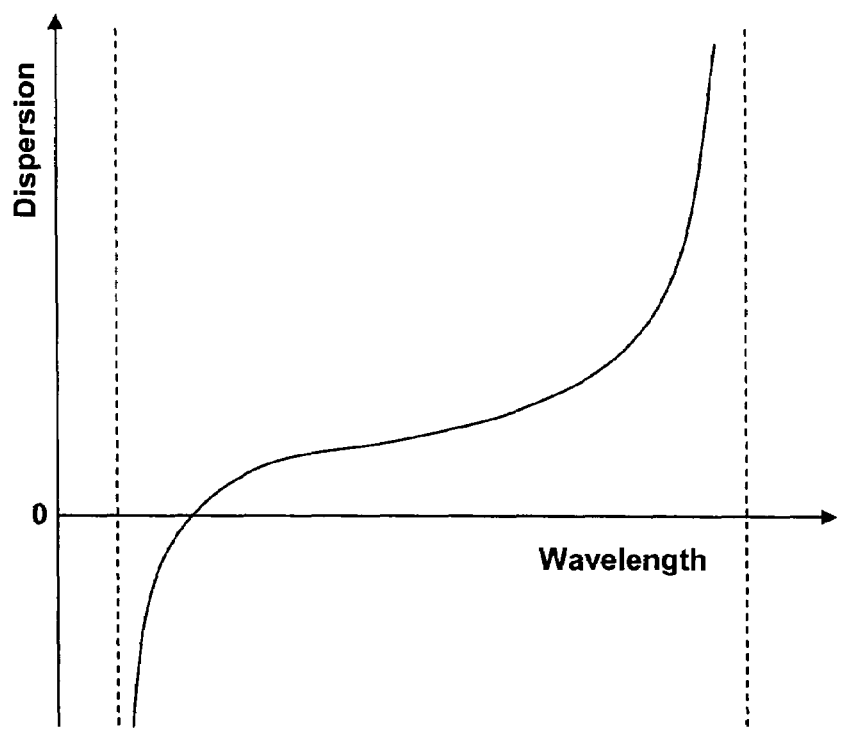
FIG. 3A illustrates dispersion variation with wavelength in a photonic bandgap fiber designed for operation in a 1550 nm range.

However, the applicants have observed that towards the edges of the bandgap, dispersion sharply decreases to very large negative values (at the short wavelength edge) and sharply increases to a very large positive values (at the long wavelength edge), forming an overall shape of D(1) dependence resembling a tangent curve, as is illustrated in FIG. 3A. It is important to note that the dispersion slope increases at even faster rate than the absolute value of dispersion. Eventually it becomes too large to be possible to perfectly compensate by a stretching dispersion compensating fiber. Specifically, the applicants have observed that if the dispersion slope of a DCF stretcher and PBGF compressor is not matched across the range of wavelengths $\lambda$ in the pulses, the dispersion (and corresponding chirp in the pulse spectrum) might still be perfectly compensated at the center wavelength $\lambda c$ of the pulse, but becomes increasingly unbalanced towards the edges of the pulse spectrum. As a result, compression to the original pulse width is not possible, at least not for large stretching ratios.

Figure 3B:
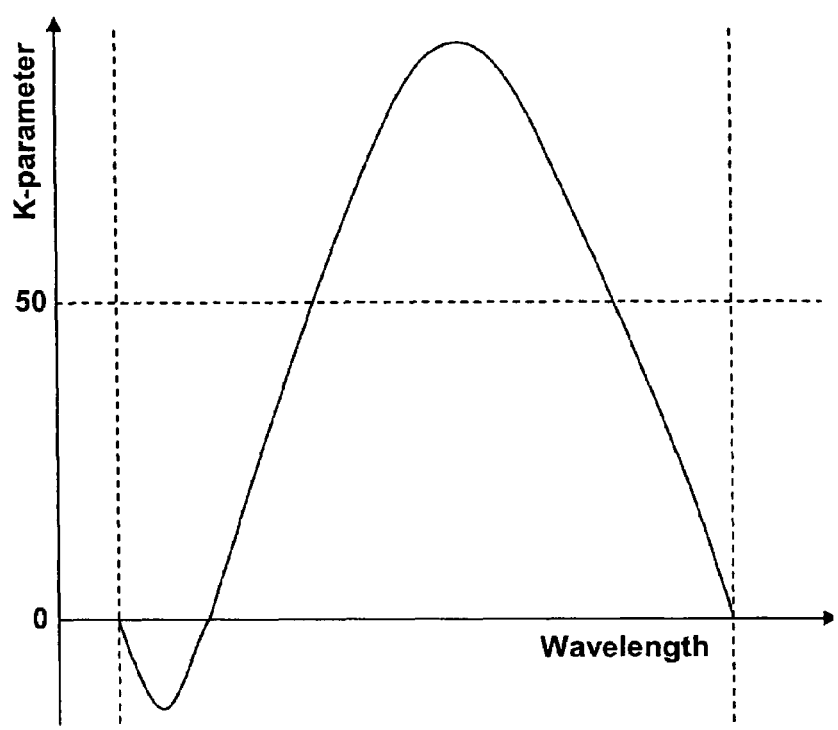
FIG. 3B illustrates how the k-parameter varies with wavelength in the same photonic bandgap fiber.

According to the CPA system 1 and method of the invention, a PBGF fiber 21 for the compressor 19 is chosen (or made) first that has a k-parameter larger than 50. The k-parameter is defined as the ratio of fiber dispersion to slope. For example, the PBGF fiber described in C. J. S. de Matos, J. R. Taylor, T. P. Hansen, K. P. Hansen, and J. Broeng, "Study of the Dispersion of an Air-core Photonic Bandgap Fiber and Its Application as a Linear Chirped Pulse Compressor", CLEO'04 Proceedings, paper CWK2, San Francisco, Calif. May 16-21, 2004, had a dispersion of about 1146 ps/nm/km and slope of 29 ps/nm$^2$/km at the central wavelength $\lambda c$ of the pulses used by the authors, giving the k-parameter a value of 39.5. As described above, due to the natural shape of the PBGF D(1) curve, the k-parameter reaches its maximum value in approximately the middle of the bandgap, but decreases towards the edges of the bandgap. The general shape of the variation of the k-parameter over the bandgap of the PBGF 21 is illustrated in FIG. 3B. A compressor PBGF 21 can be selected or manufactured so that the center wavelength $\lambda c$ of the amplified optical pulse lies closer to the center wavelength of the bandgap where k-parameter values are larger. For example, PBGF having a dispersion of 40 ps/nm/km dispersion and 0.4 ps/mn$^2$/km slope is commercially available from the assignee of this application, Corning, Inc. DCF stretcher fibers 17 with negative (normal) dispersion, negative dispersion slope and k-parameter values larger than 50 can be designed by known waveguide design approaches.

A well known example of DCF with k approximately equal to 50 is Corning DCF fiber for LEAFÔ. Once a PBGF compressor fiber 21 is chosen or made in accordance with the aforementioned criteria, a matching DCF can be selected or made to provide exact dispersion and slope compensation throughout the entire spectral content of the pulse provided that the k>50 condition is met.

Figure 4A:
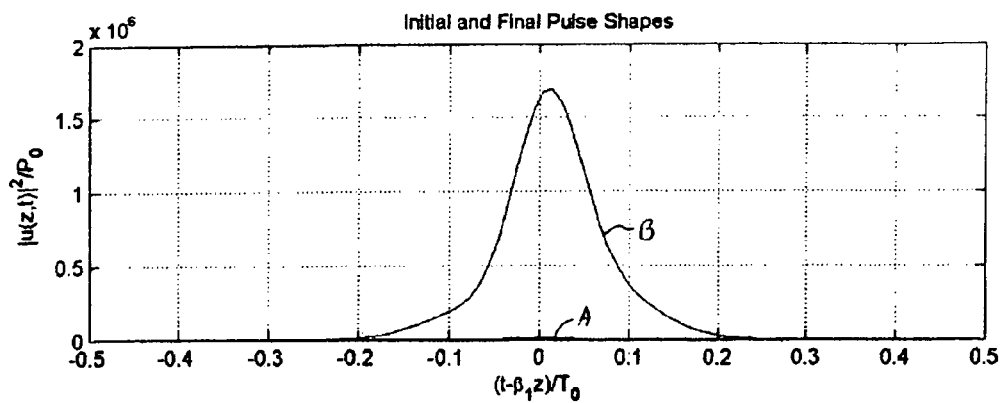
FIG. 4A illustrates the initial and final pulse shapes of an all-fiber CPA system of the invention wherein not only the total amount of dispersion between the hollow core photonic bandgap fiber and dispersion compensating fiber is matched, but also the slopes of the dispersion over wavelength functions D(X) of the two fibers are symmetrically matched.

FIG. 4A illustrates the initial and final pulse shapes of the all-fiber CPA system 1 of the invention wherein not only the total amount of dispersion between the pulse compressing PBGF 21 and DCF 17 is matched, but also the slopes of the dispersion over wavelength functions D($\lambda$) of the two fibers are symmetrically matched. All conditions in these simulation-generated curves are the same as for FIG. 2A except the PBGF compressor 21 has a k-parameter larger than 50 (k=100), and the DCF stretcher 17 now has the same k-parameter as PBGF, k=100 (dispersion slope of 1 ps/nm$^2$/km). As can be seen from the figure, the pulse is compressed to the original 100 femtosecond width, and the peak output power is 1.7 MW (pulse energy 170 nanojoules). While the full 200 nJ/2 MW pulse energy/power available after amplification is not conserved due to the assumed loss of the PBGF compressor 21 of 20 dB/km, the slope matching of the D(1) curve has resulted in a peak power output that is close to an order of magnitude higher than in the case of FIG. 2A.

Figure 4B:
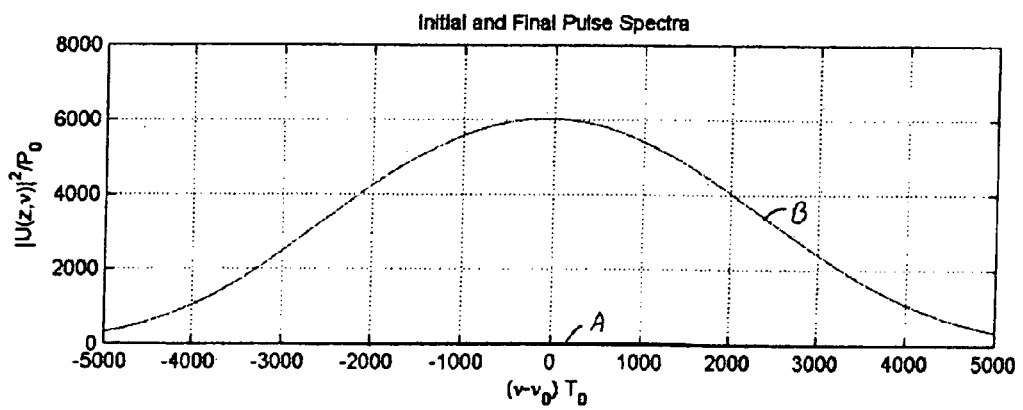
FIG. 4B illustrates that the spectrum of the initial and final pulses stay the same because there is no non-linear optical effects in the photonic bandgap fiber.

FIG. 4B illustrates that the spectrum of the initial and final pulses stay the same as there are no non-linear optical effects in the photonic bandgap fiber.

Figure 5A:
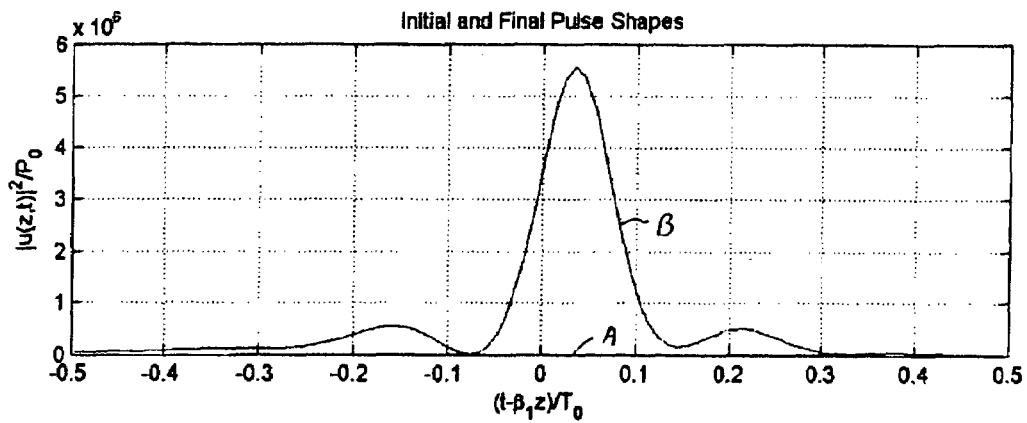
FIG. 5A illustrates the final pulse shape generated by a modified form of the CPA system of the invention capable of pulse amplification to the energy of more than 500 nanojoules, wherein a slightly shorter length of photonic bandgap compressor fiber is used to compensate for the enhanced chirp that such fiber provides at high optical pulse energy levels due to self-phase modulation.
Figure 5B:
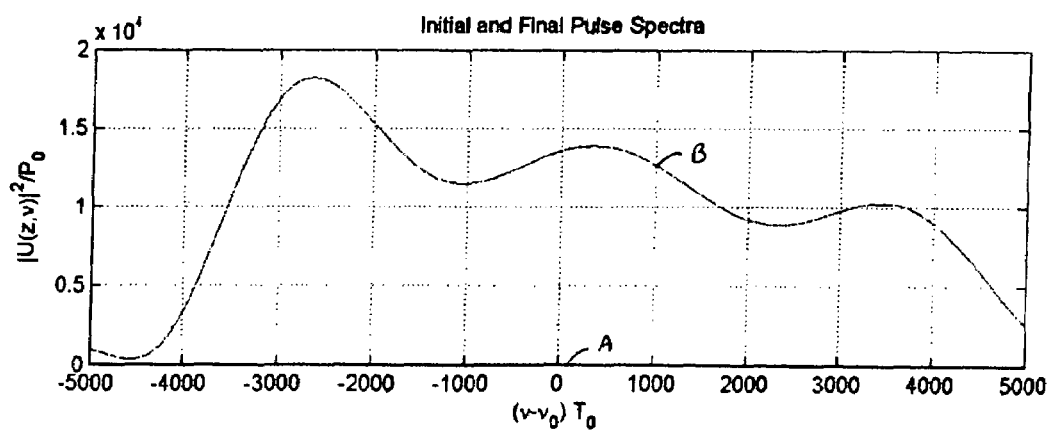
FIG. 5B illustrates the spectral broadening of the final pulse shape at optical pulse energy levels that induce self-phase modulation in the photonic bandgap compressor fiber.

For higher than 23 dB amplification, effects of self-phase modulation (SPM) in the PBGF 21 compressor begin to appear. It is still possible to achieve higher than 2 MW peak power, but at the expense of a small pulse pedestal. FIG. 5A plots the results of a simulated experiment with conditions identical to those of FIG. 4A except for two. First, the fiber amplifier 3 now produces 27 dB of gain. As it turns out, due to the SPM induced spectral broadening and additional chirp, the optimum compression in this case is achieved for the slightly shorter length of PBGF 21 than dictated by ideal dispersion and slope compensation. Hence the second difference is that the length of the PBGF 21 is shortened from 50 meters to 47 meters. As can be seen from FIG. 5A, >90% of the pulse energy (>550 nanojoules) is still contained in the main pulse, compressed to less than 100 femtoseconds width, and a peak power of 5.5 MW is reached. The optimum PBGF length needed for such a nonlinearity-assisted compression in a practical CPA system can be determined experimentally or from a numerical simulation analogous to those described here. FIG. 5B illustrates how the spectrum of the final pulse broadens due to SPM compared to the undistorted spectrum of FIG. 2B and FIG. 4B, due to the nonlinearity in the PBGF 21 compressor.

Even higher output peak power/energy values can be achieved if the compressor PBGF 21 is evacuated to eliminate the nonlinearity of air filling the hollow core and/or the PBGF is designed with a higher air-fill fraction for the cladding (and therefore lower overlap of the optical field with glass). Stretching ratios on the order of 500 times used in the previously numerical simulations can be produced (as required depending on the effective nonlinearity of the fiber amplifier 3) by simply changing the length of both PBGF 21 and DCF 17. A low loss PBGF made by Corning, Inc. has an attenuation of only 12 dB/km, so using a compressor fiber length of 100 meters or even more is feasible. And finally, the dispersion and dispersion slope of the amplifying fiber 5 can easily be taken into account by slightly adjusting the target length and dispersion slope of the DCF 17.

Figure 6A:
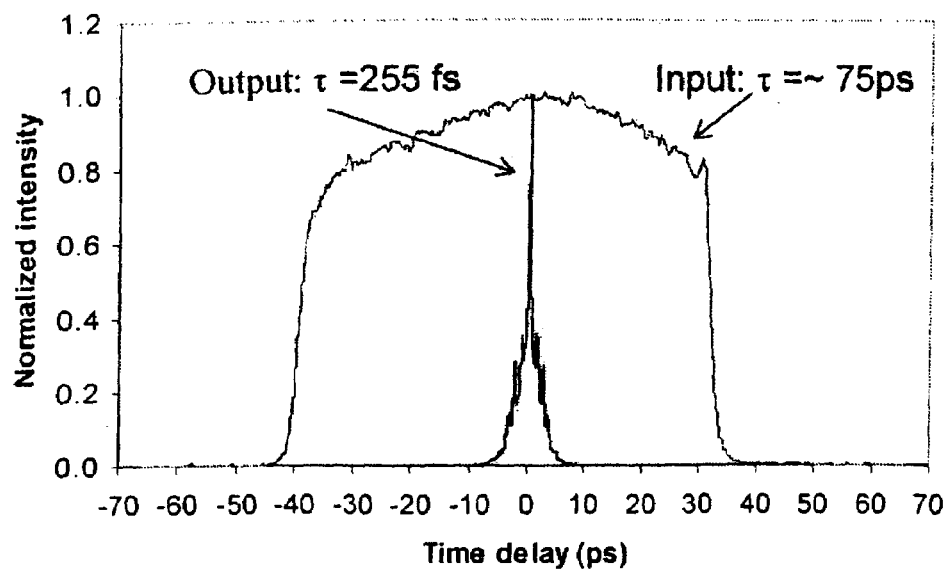
FIG. 6A shows autocorrelation traces of input and output pulses of an example all-fiber CPA system of the invention.
Figure 6B:
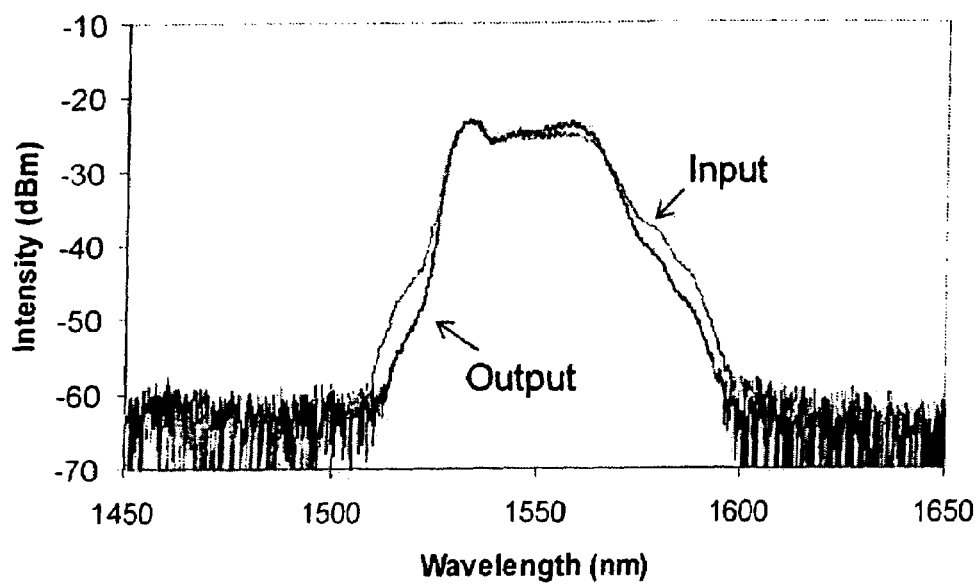
FIG. 6B shows optical spectra of the input and output pulses FIG. 6A for the same CPA system as in FIG. 6A, showing their close correlation.

FIGS. 6A and 6B illustrate experimental results obtained by an all-fiber chirped pulse amplification system 1 embodying the invention. Input pulses were generated from a pulse generator 13 formed from a stretched mode-locked fiber laser. The pulses had a 120 femtosecond width and a spectral bandwidth of 55 nanometers. The input pulse was first stretched to 25 picoseconds by using a 15 meter long DCF 17 with a dispersion of 110 ps/nm/km and a dispersion slope of −0.81 pS/mn²/km at 1550 nanometers. A tunable attenuator was used to adjust the input power of the pulses into the DCF 17 in order to avoid fiber nonlinearity in the DCF 17. The stretched pulses were then amplified by a fiber amplifier having a pre-amplifier and a power amplifier. To avoid a soliton effect in the power amplifier, Er-doped fiber with normal dispersion was used in the power amplifier 3. The output pulses of the power amplifier 3 were further broadened to about 75 pico seconds by the dispersion of the power amplifier 3. The average output power of the pulses could reach up to 120 mW, which was limited by the pump power of the amplifier 3. Finally, a piece of PBGF 21 was directly connected to the output end of the Er-doped fiber of the power amplifier 3 to compress the stretched pulses.

Unlike the prior art, a long length (50 m) and low dispersion (−25 ps/nm/km at 1560 nm) PBGF 21 (with a dispersion slope of ~0.5 ps/nm 2/km) was used in our system 1. Because the change of the dispersion with wavelength is a tangent curve, high value of k parameter is potentially achieved in the relatively low dispersion range near the middle of the bandgap. By optimizing the length of the DCF (to 15 m) and polarization state of the pulses, the output pulses could be re-compressed to 255 femtoseconds. The autocorrelation traces and optical spectra of the input and output pulses of the PBGF are shown FIGS. 6A and 6B, respectively. The spectral bandwidth of the output pulses is reduced to 34 nanometers due to the limited gain bandwidth of the amplifier 3, giving a time-bandwidth product of 1.0 which is close to the value of the output pulse of the pulse generator 13. This implies that besides the mismatch of the dispersion slopes between the DCF and PBGF (perfect match was not achieved due to the limited choice of existing fiber samples), the spectral filtering effect of the amplifier is a major reason for the broadening of the output pulses. The maximum average output power was about 31 mW with 120 mW power launched to the PBGF, which was limited by the pump power of the power EDFA 3. More than half of the loss comes from the coupling between the Er-doped fiber 5 and PBGF 21, which is why the use of a low loss connection, such as a fusion splice 23b, is preferred. As shown in FIG. 6A, the pulse pedestal was observed in the compressed pulses. It is believed that the appearance of the pulse pedestal is caused by polarization mode dispersion (PMD) and higher order mode coupling in PBGF 21.

While this invention has been described with respect to a number of specific examples, many variations, modifications and additions to this invention will become apparent to persons of skill in the art. All such variations, modifications and additions are intended to be encompassed within the invention, which is limited only by the appended claims and equivalents thereto.

We claim:

1. An all fiber chirped pulse amplification system, comprising:
   an optical fiber amplifier having an input and an output that amplifies optical pulses having a center wavelength $\lambda c$;
   a pulse compressing length L1 of hollow core photonic bandgap fiber, said photonic bandgap fiber (i) configured to compress pulse width to less than 200 femtoseconds, (ii) having a dispersion value D1 and a dispersion slope S1 that varies over a wavelength $\lambda$ of the pulses (iii) is optically connected to the output of the fiber amplifier and (iv) having a k-parameter defined by a ratio of D1 over the slope of the function $D1(\lambda)$ that is larger than 50, and
   a pulse stretching length L2 of dispersion compensating optical fiber connected to the input of the fiber amplifier having a dispersion value D2 such that
   L1D1=−L2D2.

2. The all fiber chirped pulse amplification system of claim 1, wherein said dispersion compensating fiber stretches the length of said optical pulses by more than 100 times.

3. The all fiber chirped pulse amplification system of claim 1, wherein said photonic bandgap fiber compresses pulse width to less than 100 femtoseconds, and wherein said dispersion compensating fiber stretches the length of said optical pulses by more than 400 times.

4. The all fiber chirped pulse amplification system of claim 1, wherein said photonic bandgap fiber compresses the optical pulses with a pulse energy greater than 100 nanojoules.

5. The all fiber chirped pulse amplification system of claim 1, wherein said photonic bandgap fiber compresses the optical pulses with a pulse energy greater than 500 nanojoules.

6. The all fiber chirped pulse amplification system of claim 1, wherein said photonic bandgap fiber is gas filled.

7. The all fiber chirped pulse amplification system of claim 1, wherein said photonic bandgap fiber is evacuated to minimize non-linear distortion.

8. The all fiber chirped pulse amplification system of claim 1, wherein said photonic bandgap fiber and said dispersion compensating optical fiber are fusion spliced to an output end and input end, respectively, of said optical fiber amplifier to reduce losses at said optical connections.

9. The all fiber chirped pulse amplification system of claim 1, wherein said fiber amplifier includes optical fiber doped with a rare earth ions.

10. The all fiber chirped pulse amplification system of claim 9, wherein said doped optical fiber is doped with one of erbium and ytterbium and has normal dispersion to avoid a soliton effect in the amplifier.

11. The all fiber chirped pulse amplification system of claim 1, further comprising a pulse generator that generates pulses having a center wavelength $\lambda c$ that is substantially the same as a center wavelength of the bandgap of the photonic bandgap fiber.

12. The all fiber chirped pulse amplification system of claim 1, further comprising a polarization controller optically connected to the output of the optical fiber amplifier that controls a polarization state of the optical pulses.

13. The all fiber chirped pulse amplification system of claim 12, further wherein all fibers and components in the chirped pulse amplification system are polarization maintaining.

14. An all fiber chirped pulse amplification system, comprising: a fiber amplifier including a length of optical fiber doped with a rare earth ions having an input and an output that amplifies optical pulses having a center wavelength $\lambda c$;
   a pulse compressing length of hollow core photonic bandgap fiber having a dispersion value D1 and a dispersion slope S1 that varies over a wavelength $\lambda$ of the pulses that is optically connected to the output of the fiber amplifier and having a k-parameter defined by a ratio of D1 over the slope of the function $D1(\lambda)$ that is larger than 50, wherein the center wavelength of the bandgap is substantially the same as $\lambda c$, said photonic bandgap fiber configured to compress pulse width to less than 200 femtoseconds, and a pulse stretching length L2 of dispersion compensating optical fiber connected to the input of the fiber amplifier having a dispersion value D2 such that L1D1=−L2D2.

15. The all fiber chirped pulse amplification system of claim 14, wherein said dispersion compensating fiber stretches the length of said optical pulses by more than 100 times.

16. The all fiber chirped pulse amplification system of claim 14, further comprising a pulse generator that generates pulses having a center wavelength that is substantially the same as the center wavelength of the bandgap of the photonic bandgap fiber, and a polarization controller optically connected to the output of the optical fiber amplifier that controls the polarization state of the optical pulses.

17. The all fiber chirped pulse amplification system of claim 14, wherein the pulse generator generates linearly polarized light, and all fibers and components in the chirped pulse amplification system are polarization maintaining.

18. A chirped pulse amplification method, comprising the steps of:

generating optical pulses having a wavelength $\lambda$ and a center wavelength $\lambda c$ and a pulse width of less than 200 femtoseconds;

stretching the length of said optical pulses by a factor of more than 100;

amplifying the stretched optical pulses, and compressing the amplified, stretched pulses to a pulse width of less than 200 femtoseconds with a length L1 of hollow core photonic bandgap fiber having a dispersion value D1 and a dispersion slope S1 that varies over $\lambda$ and having a k-parameter defined by a ratio of D1 over the slope of the function D1($\lambda$) that is larger than 50.

19. The chirped pulse amplification method defined in claim 18, wherein said pulses are stretched by a length L2 of dispersion compensating fiber having a dispersion value D2 and wherein L1D1=−L2D2.

20. The chirped pulse amplification method defined in claim 18, wherein said photonic bandgap fiber compresses the optical pulses with a pulse energy greater than 100 nanojoules.

* * * * *